Sept. 5, 1961 J. R. HANSEN 2,999,184

CONTROL OF PHOTOEMISSION

Filed July 12, 1957

INVENTOR.
J.R. HANSEN

BY Wade Koontz and Martin J. Finnegan
ATTORNEYS

United States Patent Office 2,999,184

Patented Sept. 5, 1961

2,999,184

CONTROL OF PHOTOEMISSION

J. Richard Hansen, Pittsburgh, Pa., assignor, by mesne assignments, to the United States of America as represented by the Secretary of the Air Force Filed July 12, 1957, Ser. No. 671,682
3 Claims. (Cl. 315—10)

Figures 1, 2:
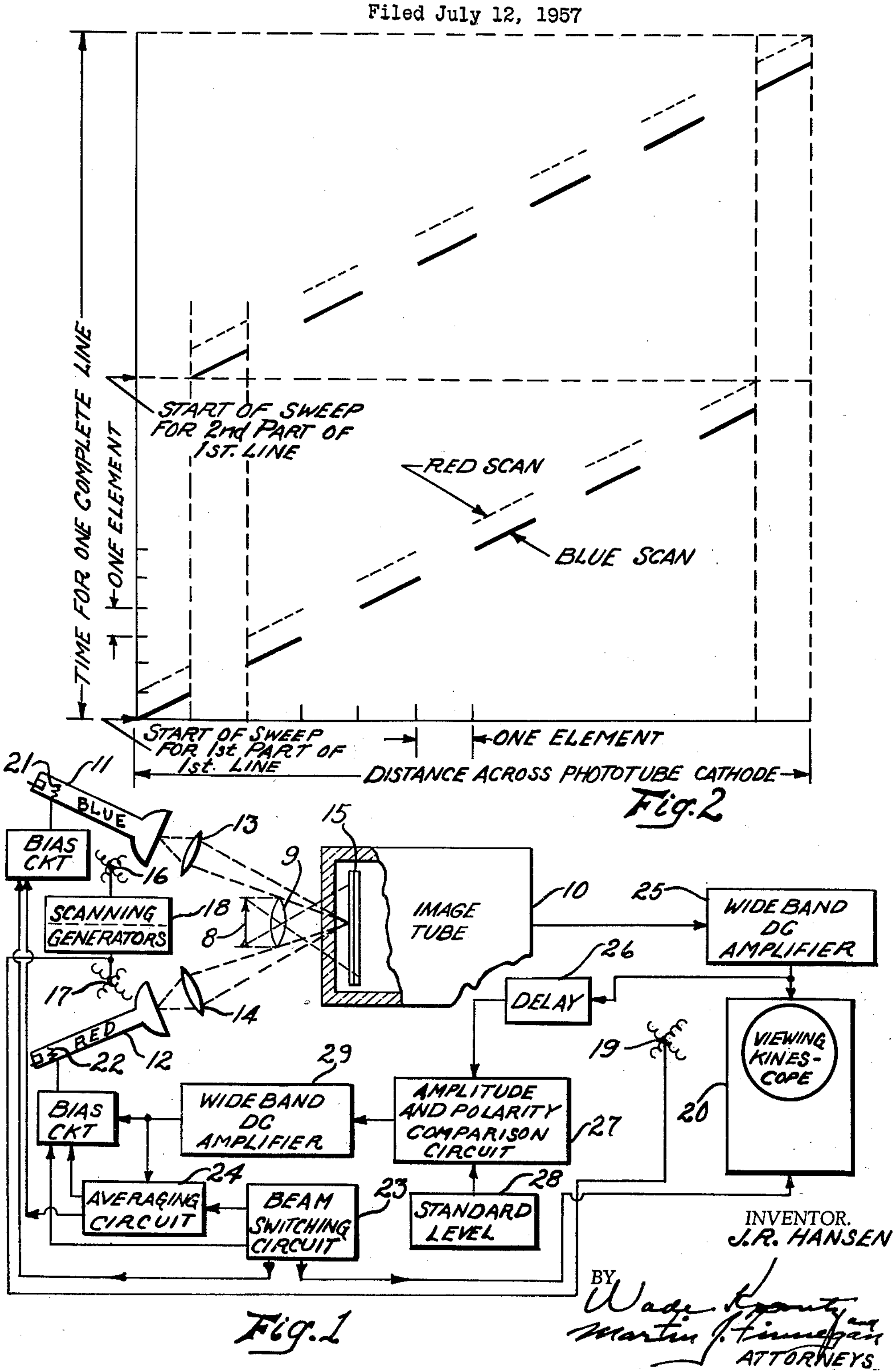

This invention relates to photoemission, and particularly to the correction of imperfection-induced, undesirable variations in the strength of the photocurrent derived from a photo-emissive element.

In the investigation of the thermal radiation characteristics, a thermal image, or other source of heat radiation to be reproduced or measured, is projected onto a photoemissive element, then scanned by a flying-spot light beam to produce a photocurrent whose amplitude is modulated by the temperature distribution set up along the photoemissive surface by the thermal energy applied thereto. In addition to this modulation, inhomogeneities and other imperfections in the photosurface give rise to photoemission variations that tend to distort the desired temperature-governed modulation factor, thus introducing sensitivity fluctuations that detract from the fidelity of the transmitted signal. The present invention provides methods and means for discriminating against such sensitivity fluctuations and thereby improving the accuracy of the transmitted photocurrent as a measure of the thermal radiation to be detected.

More specifically, the invention proposes the introduction of two scanning operations with light beams of relatively short and long wave lengths, respectively, and then using the photocurrent derived from one scanning operation to control the photocurrent output derived from the other. In this manner modulation tendencies due to surface inhomogeneities are caused to be suppressed before they have an opportunity to affect the photocurrent output. This effect differs from that of certain prior corrective procedures wherein two scanning operations are allowed to produce two distinct photocurrent outputs, each containing the imperfection-induced error. The two outputs (in such prior art arrangements) are thereafter subtracted, one from the other, to erase the error factor. This prior art subtracting and erasing procedure is described in detail in U.S. patent application, Serial No. 619,094 filed by Max Garbuny on or about October 29, 1956, and entitled "Thermal Image Converter."

An object of the invention, therefore, is to produce a novel method of freeing a signal output representative of thermal radiation of undesirable imperfection-induced error factors.

A second object is to provide novel electronic circuitry for achieving the stated error-eliminating action.

Other objects and advantages attributable to the invention will be indicated upon reference to the following description of the invention as illustrated in the accompanying drawings wherein:

FIG. 1 is a block diagram of electronic components interrelated to facilitate practice of the invention; and FIG. 2 is a diagram showing the relationships prevailing between the two scanning operations.

In photothermionic image conversion it is known that the effects of uneven temperature distribution (over the photoemissive surface) can be controlled by causing the thermal image to be scanned by a "flying-spot" light beam whose wave length is selected to correspond, or to approximate, the wave length of the threshold photocurrent emitted by the photoemissive surface. In such an arrangement the photocurrent is modulated by the temperature distribution over the photosurface. In addition to this modulation, inhomogeneities in the photosurface give rise to further variations in photoemission, from point to point along the surface, as the scanning spot traverses such points of varying sensitivity.

To discriminate against such sensitivity fluctuations, it has been proposed to scan each element of the thermal image with two different light spots. One spot, of relatively short wavelength with respect to the photosurface, produces a current relatively independent of temperature changes. This may be used for comparison with the photocurrent triggered by a long wavelength spot which then gives the effect upon which the Photothermionic Image Converter is based. If a surface element is now scanned successively with lights of these two different wave lengths, and if the relative intensities are so adjusted to produce equal photocurrents at the operating temperature, then by subtracting the long-wavelength-produced photocurrent from the short-wavelength-produced photocurrent, an output essentially free of surface variations may be obtained.

In the present invention the above-described concept of dual scanning is utilized, with the two "flying spots" being of short and long wave lengths, respectively. However, instead of exactly setting the relative brightnesses and then subtracting the two outputs, the present invention utilizes the short wavelength (hereinafter referred to as "blue") photocurrent to control the long wavelength (hereinafter referred to as "red") light output. The apparatus for accomplishing this will now be described.

In FIG. 1, reference characters 8 and 9 designate an infra-red image and lens, and character 10 designates an image converting tube of conventional structure, having its photo-emissive element designated by numeral 15, disposed in the path of "blue" and "red" light beams originating in cathode ray tubes 11 and 12, which light beams are directed onto the photolayer of the image converting tube 10 by directive lenses 13 and 14, respectively, corresponding to the "red" and "blue" beam directive lenses "13" and "14" of the Garbuny patent application above identified. The beams move across the surfaces of the screens of tubes 11 and 12 under the control of the deflection coils 16 and 17, respectively, electrically activated by scanning generator 18, which also activates deflection coils 19 of the viewing kinescope 20. Suitable biasing means in the nature of control grids 21 and 22 coact with deflection coils 16 and 17, respectively, to control the cathode ray sweep action in the tubes 11 and 12, said biasing circuits being in turn governed by the cyclic operation of beam switching circuit 23, with the aid of averaging circuit 24. The operation is as follows:

(1) The blue beam scans one element, during which time the red beam and the viewing kinescope are biased beyond cutoff by a switching circuit.

(2) The phototube blue output is amplifier (at 25), and then delayed (at 26) by a time equal to one element, and compared (at 27) to a fixed standard 28, such as a battery.

(3) The difference between this standard and the blue output in amplitude and polarity is then fed to a wideband D.C. amplifier 29.

(4) This amplifier output, connected directly to the red scanner control grid, then causes the red beam intensity to be raised or lowered in proportion to the deviation of the blue beam from the standard during the interval of the red scan of the element.

(5) After the blue beam has completed the scanning of one element the switching circuit turns off the blue beam and turns on both the red beam and the viewing kinescope. The red beam then scans the identical element that has just been scanned by the blue beam.

(6) This sequence repeats itself, as seen in FIG. 2, thereby scanning every other element along any given line. To cover the alternate unscanned elements, the blue beam is started on the first unscanned element on the next horizontal sweep.

(7) The output of the phototube, while the red beam is scanning (containing the signal information), is amplified in a video amplifier whose output modulates a viewing kinescope. This kinescope and the red scanner are sweept in synchronism from the same scanning source.

(8) A conductive circuit with a long time constant compared to the frame time is connected from the output of the D.C. amplifier to the control grids of the two scanner tubes. This circuit averages the amplitudes of the phototube red and blue outputs over a long period of time and adjusts both scanning light outputs to give constant photocurrents equal to the standard of comparison.

An alternate and simpler method of using the blue scan information is to utilize the fact that the variation of surface sensitivity is a slowly changing relatively smooth function of position along the photocathode. Two circuit simplifications can then be made; substitution of a storage circuit for the delay, and synchronization of the two scanner sweeps from the same sweep source. These two simplifications then modify the operation of the control method as follows: (1) both red and blue sweeps start together and are again optically registered for one line. (2) the blue feedback information (red correction signal) is stored (e.g., by a capacitor) while the blue beam is on, and then fed to the red control grid while the red beam is on.

The advantages of the control method are as follows:

(1) The red and blue intensities do not have to be initially set exactly equal to each other. Instead, the blue intensity is adjusted to approximately the desired red intensity and the standard is then set close enough to obtain the correcting signal.

(2) The red photocurrent can be instantaneously controlled, by adjusting the gain of the D.C. amplifier, as closely as desired to match the standard of comparison.

(3) Besides the primary function of elimination of photoemission variation, stabilization of average photocurrent is obtained for both the blue scanner photocurrent and red scanner photocurrent. Thus a correction is applied to compensate for phosphor ageing or other changes in scanner light output, and also corrects for phototube ageing or fatigue.

What I claim is:

1. The method of maintaining the signal output of an image conversion apparatus free of error due to inhomogeneities in the photo-emissive surface, which comprises the steps of scanning said surface with light beams of relatively long and short wave lengths, respectively, and utilizing the photocurrent derived from one of said scanning operations to control the output of photocurrent from the other of said scanning operations.

2. The combination, with an image converter tube, of a pair of color scan generators for applying beams of first and second colors, respectively, to the photo-emissive element of said tube, each of said scan generators having a control grid, means responsive to the photocurrent developed during the red color scan to vary the voltage applied to the blue-scan control grid, and means responsive to the photocurrent developed during the blue color scan to vary the voltage applied to the red-scan control grid.

3. The combination, with an image converter tube, of a pair of color scan generators for applying beams of first and second colors, respectively, to the photo-emissive element of said tube, each of said scan generators having a control grid, means responsive to the photocurrent developed during the first color scan to vary the voltage applied to the second scan control grid, and means responsive to the photocurrent developed during the second color scan to vary the voltage applied to the first scan control grid.

References Cited in the file of this patent

UNITED STATES PATENTS

| | | |
|---|---|---|
| 2,804,498 | Theile | Aug. 27, 1957 |
| 2,870,370 | Garbuny et al. | Jan. 20, 1959 |
| 2,929,868 | Leiter | Mar. 22, 1960 |
| 2,938,141 | Garbuny et al. | May 24, 1960 |